(12) United States Patent  
Jonsson

(10) Patent No.: US 7,710,945 B2
(45) Date of Patent: May 4, 2010

(54) METHOD AND ARRANGEMENT FOR MULTIMEDIA COMMUNICATION

(75) Inventor: Bjorn Jonsson, Saltsjobaden (SE)

(73) Assignee: Tekefonaktiebolaget L M Ericsson (Publ), Stockholm (SE)

( * ) Notice: Subject to any disclaimer, the term of this patent is extended or adjusted under 35 U.S.C. 154(b) by 1030 days.

(21) Appl. No.: 10/504,670

(22) PCT Filed: Feb. 11, 2002

(86) PCT No.: PCT/SE03/00228

§ 371 (c)(1),
(2), (4) Date: Aug. 13, 2004

(87) PCT Pub. No.: WO03/071764

PCT Pub. Date: Aug. 28, 2003

(65) Prior Publication Data

US 2005/0147118 A1 Jul. 7, 2005

(30) Foreign Application Priority Data

Feb. 19, 2002 (SE) .................................. 02000492

(51) Int. Cl.
*H04L 12/66* (2006.01)
(52) U.S. Cl. ...................................................... 370/352
(58) Field of Classification Search ................. 370/352, 370/465
See application file for complete search history.

(56) References Cited

U.S. PATENT DOCUMENTS 5,638,412 A    6/1997   Blakeney, II
7,125,336 B2 * 10/2006   Anttila et al. .................. 463/40
2003/0133558 A1 *  7/2003   Kung et al. ............. 379/215.01
2003/0227908 A1 * 12/2003   Scoggins et al. ............ 370/352
2003/0235187 A1 * 12/2003   Iwama et al. ................. 370/352

FOREIGN PATENT DOCUMENTS

| EP | 0770968 | 10/1996 |
| EP | 0825787 A1 | 2/1998 |
| EP | 1111894 A1 | 6/2001 |
| EP | 1113631 A2 | 7/2001 |
| WO | WO9818237 A1 | 4/1998 |
| WO | WO9824224 A1 | 6/1998 |
| WO | WO0041406 A1 | 7/2000 |
| WO | WO0049783 A1 | 8/2000 |
| WO | WO0135585 A1 | 5/2001 |

* cited by examiner

*Primary Examiner*—Kwang B Yao
*Assistant Examiner*—Tung Q Tran

(57) ABSTRACT

Users, who have simultaneous access to a plurality of terminal devices, can enter into a multimedia, multiterminal user session. In a negotiation phase users agree on which media to use in a multimedia session and select the most appropriate types of terminal devices that support the selected media. Each terminal device is connected to one of a plurality of interworking communications networks. A network node (130) that is reached through any of the plurality of interworking networks manages creation and supervision of sub-sessions involving the selected terminal devices such that each type of terminal device carry at least one selected media. A versatile and media rich communication is obtained in which terminal devices currently available at a local environment are efficiently used.

14 Claims, 7 Drawing Sheets

METHOD AND ARRANGEMENT FOR MULTIMEDIA COMMUNICATION

TECHNICAL FIELD OF THE INVENTION

The present invention relates to a method for establishing a multimedia session between users having simultaneous access to a plurality of end user systems.

BACKGROUND OF THE INVENTION

The use of Internet as a general means for communication is continuously growing. The success of the Internet depends on a fruitful cooperation between manufacturers and network providers in the development of standards. The protocol suite TCP/IP has become a basic standard for Internet communication. Other standards, such as the Real Time Protocol (RTP) adds functionality to the network and allows for real time services e.g. to transfer audio and video information. To maintain quality of real time services the network must provide satisfactory characteristics throughout a real time session. Therefore, standards have been developed to communicate and process requirements e.g. concerning bit rate, and delay characteristics. In general Quality of Service (QoS) has become an important topic in the further development of Internet. To initiate a communications session between parties a handshaking procedure will first have to take place. The Session Initiation Protocol, SIP, has been developed for handling of Internet based communication. An originating party making a call towards another party (a person, information service or transaction service) initiates this procedure. The call has to be communicated to the called party who can either accept or reject the call. If a call is accepted further conditions have to be fulfilled to cater for compatibility between the means for communication that are available for the involved parties. Traditional methods for communication do not take full advantage of an environment where each party may use a choice of terminals connected by different access networks operated by different access network operators.

In general, a user who makes a network access will use a particular terminal throughout the user session and is, thus, limited to the media types supported by that particular terminal. For example, the terminal may be a mobile telephone. Many terminals, e.g. a mobile telephone, can support several media types such as voice and data. Several simultaneously ongoing sessions may be initiated at one and the same terminal, e.g. a mobile telephone, thereby enabling multimedia communication. However, a mobile phone is primarily optimized for portability and intended for voice communication and other media may be adversely affected by technical limitations such as limited processing power, memory limitations, and a small display screen. Similarly, other types of terminals are often optimized for a particular application. Thus, e.g., a Personal Digital Assistant, PDA, has a reasonably sized display screen and allows connection to a data network. A PDA is, therefore, convenient for conveying printed information such as text and image. However, a PDA may not have means for voice communication. A Personal Computer, PC, generally has enough capacity to allow for simultaneous voice and data communication over a network. However, a PC is generally less mobile than, e.g., a mobile phone and a lap-top PC usually has a battery capacity that severely limits the operative time. Thus, depending on the circumstances, a user may prefer a type of terminal that is best adapted to the prevailing communication conditions and type of desired communication.

Although standards are developed that allow communication between terminals of various manufactures there is still a problem of compatibility. For example, a user having a PC and who communicates with another user having a mobile telephone may experience compatibility problems related to the very different terminal characteristics in this case. Although both terminals can communicate from a technical point of view, from the user perspective there is e.g. an incompatibility problem related to the fact that a mobile phone can present only a very limited amount of information on a small display screen.

Besides an environment of end user systems that restricts type and quality of communication, a user might experience other limiting factors such as the availability to a called party for communication. In general, the term end user context shall, in this document, denominate a set of factors that affect the communication between parties. In particular, an end user context includes data on available end user systems and data pertaining to user communication preferences such as time and availability for communication.

It can be foreseen that end users at each instance have simultaneous access to a plurality of end user systems each having specific characteristics. It would, therefore, be advantageous to simultaneously use several end user systems according to user preferences in order to make optimal use of the various media types supported by these systems. It would, further, be advantageous to make said combination in dependence of user contexts associated with the communicating parties. User contexts may vary with time and place.

There is, thus, a need for a method and arrangement to establish a user-to-user session involving, for each end user, at least one of a plurality of simultaneously accessible end user systems, said session further being dependent of user current contexts associated with the communicating parties.

DESCRIPTION OF RELATED ART

The Session Initiation Protocol (SIP), described in IETF RFC 2543, is an application-layer control protocol, which can establish, modify and terminate a multimedia session. In order to establish a SIP session each party has an identity that can be translated into an end user system network address. An initiating party activates SIP to invite other parties. User preference information in the network determines the terminal or endpoint on which the user shall be invited and what to do in case of no reply. If the user is available on several accesses with associated terminals, the network will either poll access by access, or broadcast the invitation to a set of possible end points/terminals. SIP may then negotiate media parameters related to the identified end user systems to match for communication. The SIP protocol provides functions for establishing sessions between given end user systems but provides no support for the management of resources on a higher, user oriented level. In particular, a user might want to specify a compound user session comprising several sub-sessions each characterized of a particular type of media.

A method is described in the international patent application WO 00/49783 to establish, on a single physical channel, a plurality of terminal to terminal connections associated with different sessions. However, each user has access to only one point-to-point connection and this document fails to show how to manage a plurality of simultaneously available end user systems.

The Swedish patent application SE01011708-6 generally discloses creation and distribution of a user context. The invention further discloses the use of rules for determining parameter values and triggering of actions. Although the present invention in one aspect involves the use of contexts for controlling communications operations, the cited document does not teach or suggest the invention as claimed.

The European patent application EP99850209/0 describes a method whereby alerting a user about an incoming call is made on a user selected endpoint and responding to the alert is made on any other available endpoint further used for carrying out a communication. This document fails however to describe a method whereby a person simultaneously uses several end user systems for carrying out a multimedia user session.

The Swedish patent SE9804598 deals with the problem of how to perform call screening and terminal matching during call setup between at least two parties each having several communication terminals. However, this document fails to show the use of a plurality of simultaneously accessible terminals located within an environment of the user in order to establish a multimedia session with these terminals and there is no mention of relating a type of media with a terminal supporting that media.

SUMMARY OF THE INVENTION

It is an object of the present invention to provide a method and arrangement that overcomes limitations of known user-to-user connections. In particular, it is an object to solve a need to establish a user-to-user session involving any combination of end user systems selected from a plurality of simultaneously accessible end user systems each connected to a respective communications network.

It is another object of the present invention to provide dynamic rearrangement of a set of end user systems during an ongoing user session in dependence of a changed environment, e.g. because an end user has moved to a new location.

According to the invention there is provided a method and arrangement for multimedia communication between end users as specified in the appended claims.

In this document the term medium is generally understood as a type of information that can be exchanged in a meaningful way between communicating parties. Exemplary media are voice, text, image, and video. Thus, this term does not include the means for conveying the information such as cable or air radio channel.

The term end user system shall in this document mean a system comprising terminal device hardware and functions preferably implemented as program code executed by processing means at the terminal or on behalf of the terminal at a remote server. The end user system might be a fixed telephone, a fax machine, a mobile phone, a PC and devices connected thereto such as an answering machine, a web camera, a microphone, a speaker, a document scanner etc. A function might comprise program support for creation and communication of images or video.

Further, in this document, the term caller shall mean an end user being the initiator of a communication session and callee shall mean an end user receiving a request for communication.

The term user context shall mean a compilation of data that determines conditions for communication with the user. A shared context is a context that at least two parties have agreed on for their communication.

In the following of this document the term "alerted about incoming call" shall be understood to mean essentially the same as the term "invited to communicate" and these terms will be used interchangeably.

According to a preferred embodiment of the invention, each end user involved in the establishment of a user-to-user session can register, at a user registering entity, available end user systems and their system characteristics. A caller might select one end user system for the initiation of communication while subsequent communication might involve one or more other selected end user systems.

The objectives of the present invention are obtained by a method and arrangement as set out in the appended claims. Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

A more complete understanding of the present invention may be obtained by reference to the following Detailed Description when taken in conjunction with the accompanying drawings, which are given by way of illustration only and which do not limit the scope of the invention and wherein.

DETAILED DESCRIPTION OF THE PREFERRED EMBODIMENT

The present invention will now be described more fully hereinafter with reference to the accompanying drawings where like numbers indicate like objects and in which a preferred embodiment of the invention is shown.

Figure 1:
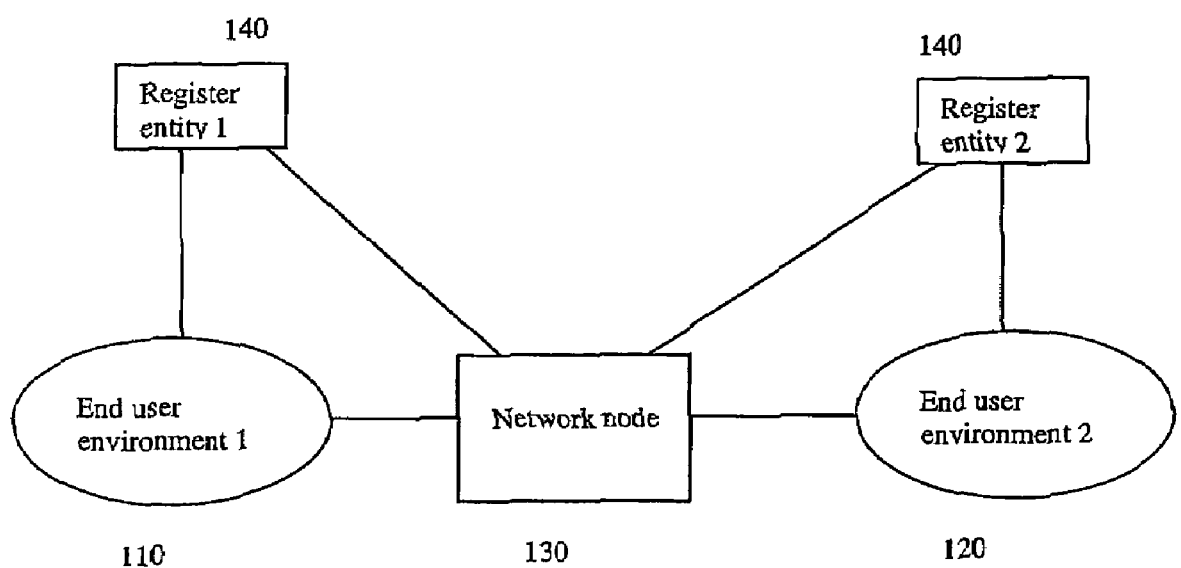
FIG. 1 is an overview functional diagram of a preferred embodiment.

Referring to FIG. 1, there is shown a functional diagram of the basic elements in an arrangement according to a preferred embodiment. At 110 and 120 there are shown a first and second user environment. An environment comprises available end user systems at the location of a user. An available system is a system that is within reach, within sight or that can be reached or sighted within a certain time or by moving a certain distance. Availability may also refer to authority for access. It is recalled that an end user system is, in this document, understood to include, besides terminal hardware, services available at the terminal or in co-operation with a remote host exemplary implementing a transcoding service generally described, in a non-limiting way, to convert one data format to another. A network node 130 can establish connections between end user systems that are selected by an end user in respective environments 110 and 120. End user system data that is required by the network node 130 is registered in registering entities 140 associated with respective environment 110 and 120.

Figure 2:
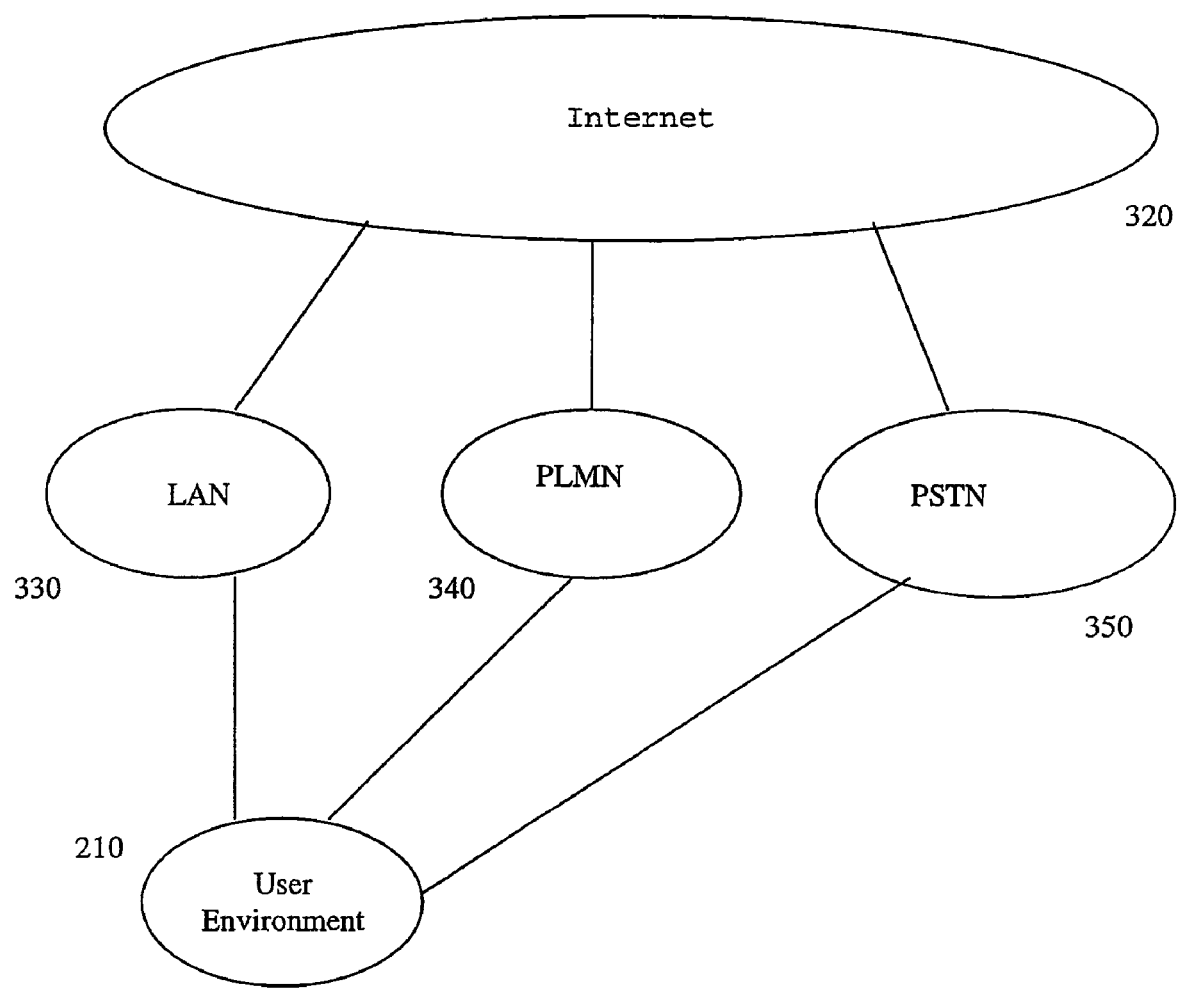
FIG. 2 is a schematic diagram of a network infrastructure.

Referring to FIG. 2, there is shown a network infrastructure. Each end user system in environment 110 connects, through at least an access network 330, 340, or 350, to Internet 320. Exemplary, network 330 might be a Local Area Network (LAN), network 340 a Public Land Mobile Network (PLMN) such as a GSM or WCDMA network, and network 350 a Public Switched Telephony Network (PSTN).

Figure 3:
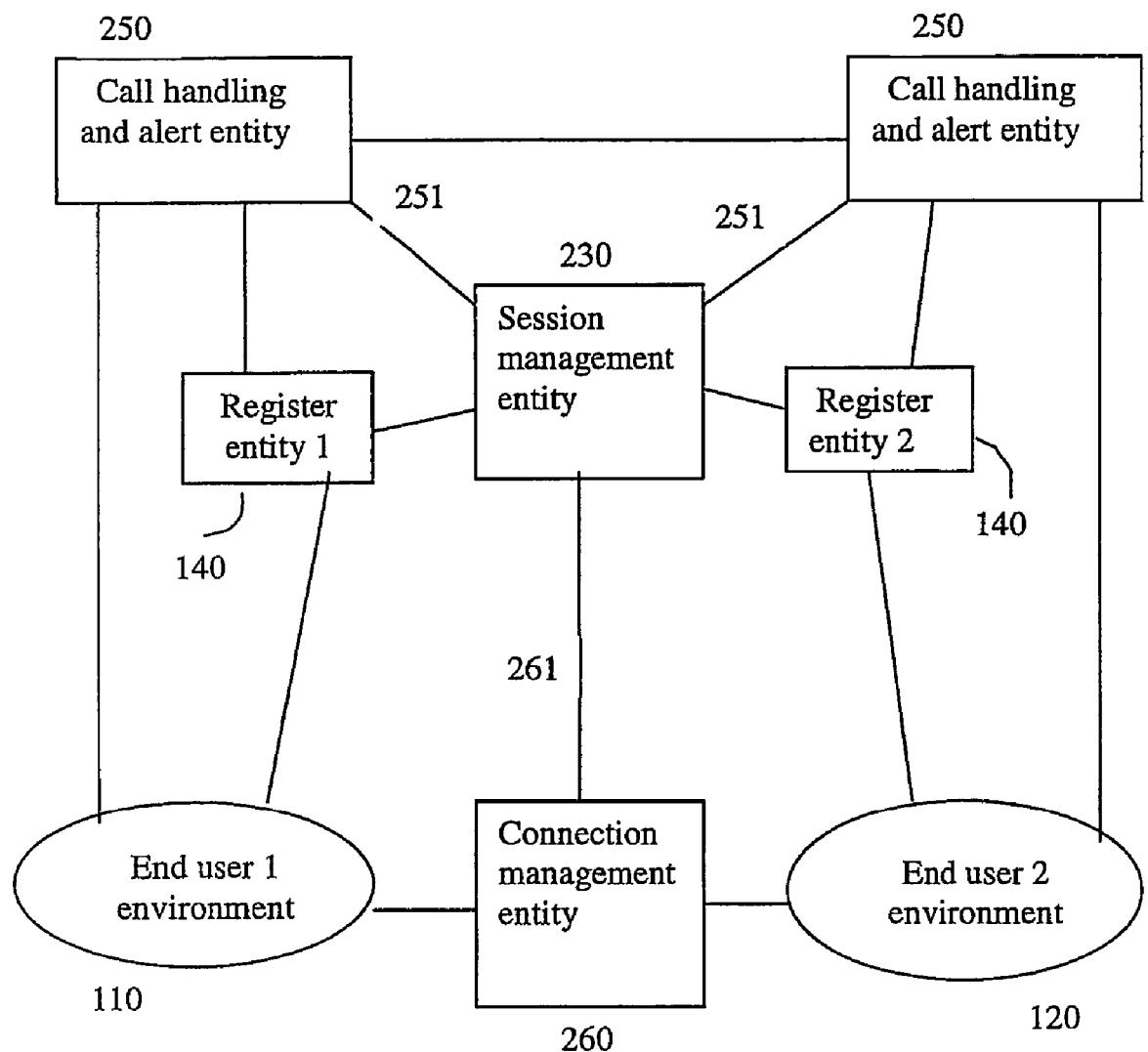
FIG. 3 is functional diagram according to a preferred embodiment of the invention.

Referring now to FIG. 3, there is illustrated a diagram relating logical functions of a preferred embodiment. The entities 230, 250, and 260 are included in the network node 130 but various other configurations are possible as is apparent for a person skilled in the art. First and second end user environments are illustrated at 110 and 120 respectively. Also shown in FIG. 3 is registering entity 140 associated with respective end user. An end user, e.g. end user in environment 110, may connect to its registering entity over at least one of the access networks to register available end user systems in the environment. Register data for an end user system comprise data on types of access to the system, types of devices for media presentation such as display, speaker, and type of information that is supported by the device, e.g. file type exemplary indicating support for processing of JPEG images. It is common in the art to use a file extension to indicate type of information and to associate application software for processing the type of information.

At 250 there is shown a call handling and alert entity associated with each end user. The call handling and alert entity is accessed through at least one of the access networks using an address, e.g. network 340 (PLMN), network 350 (PSTN) or through corresponding gateways to Internet 320.

A session management entity is shown at 230 that maintain information about all individual terminal sessions needed to set up a desired multimedia, multi-terminal communication. The session manager is connected to the register entities 140 whereby changes in any user environment can be detected. The session manager acts on such changes and may, e.g., invoke a dialogue with a user to specify new conditions for communication, i.e. a new context.

A connection manager shown at 260 is related to the session manager. The connection manager establishes, e.g. through the SIP protocol, all individual sessions involved in the overall user session.

Figure 4:
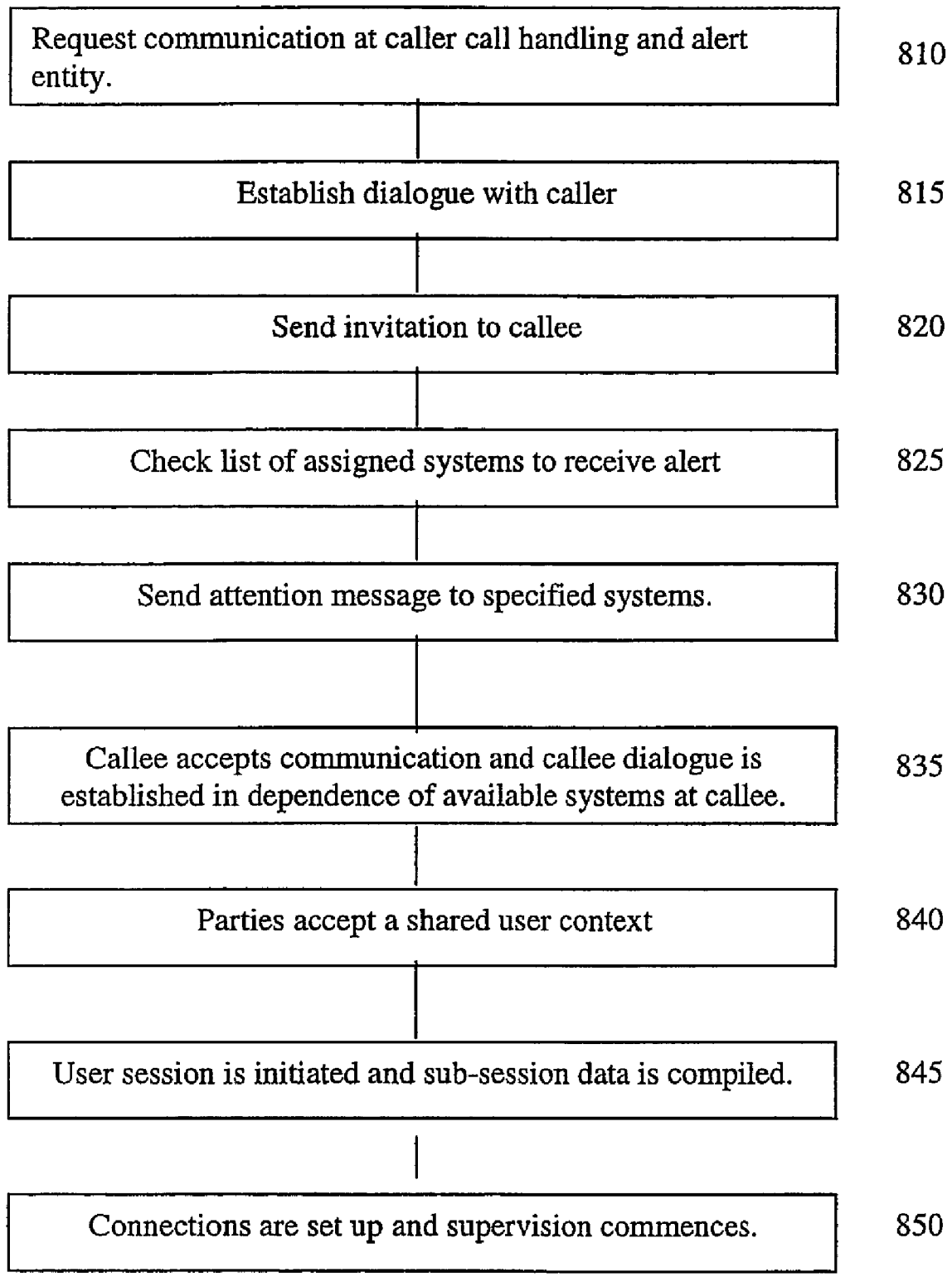
FIG. 4 is a flowchart illustrating the mode of operation according to a preferred embodiment.
Figure 5:
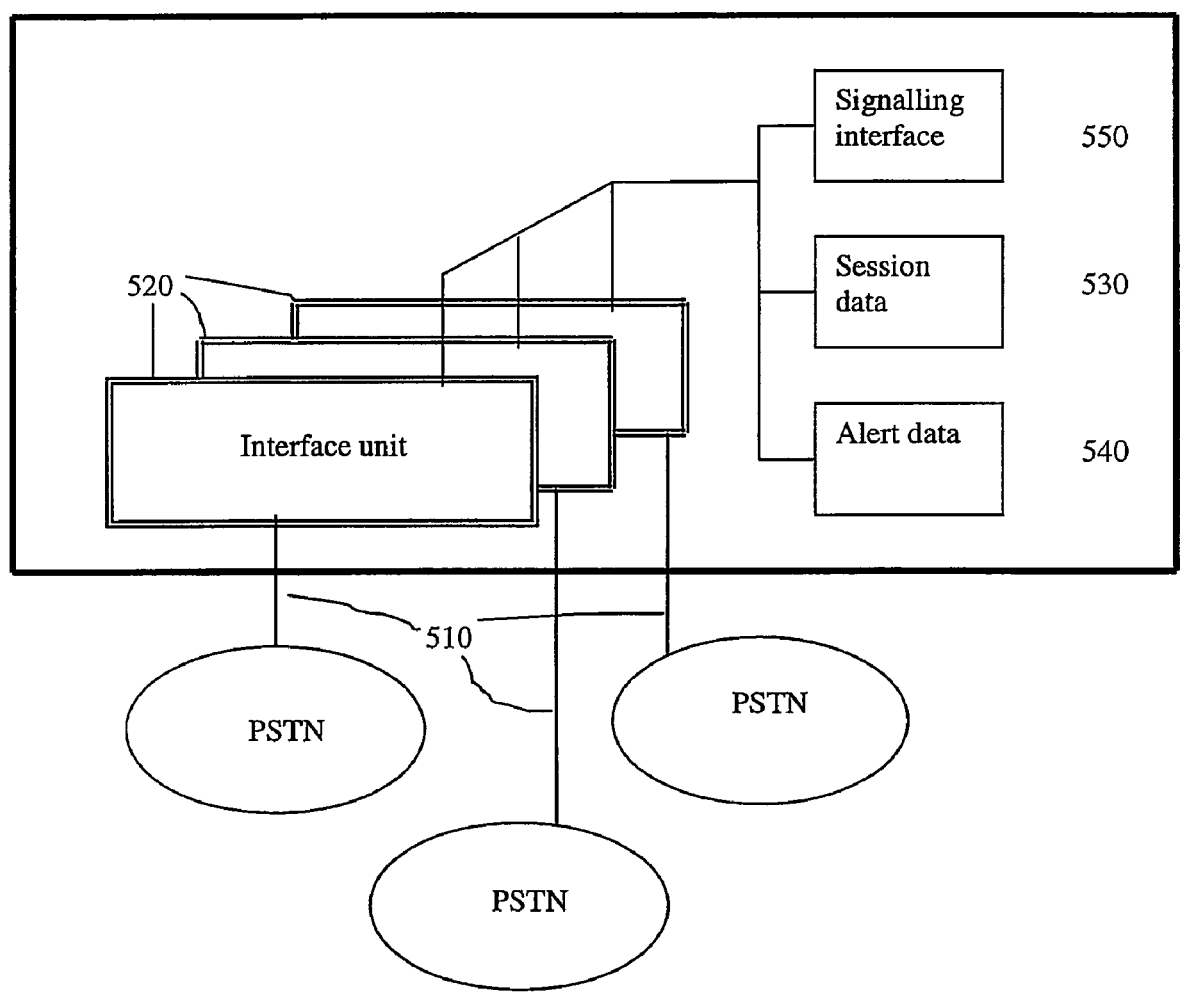
FIG. 5 is a more detailed diagram of a call handling and alert entity.
Figure 6:
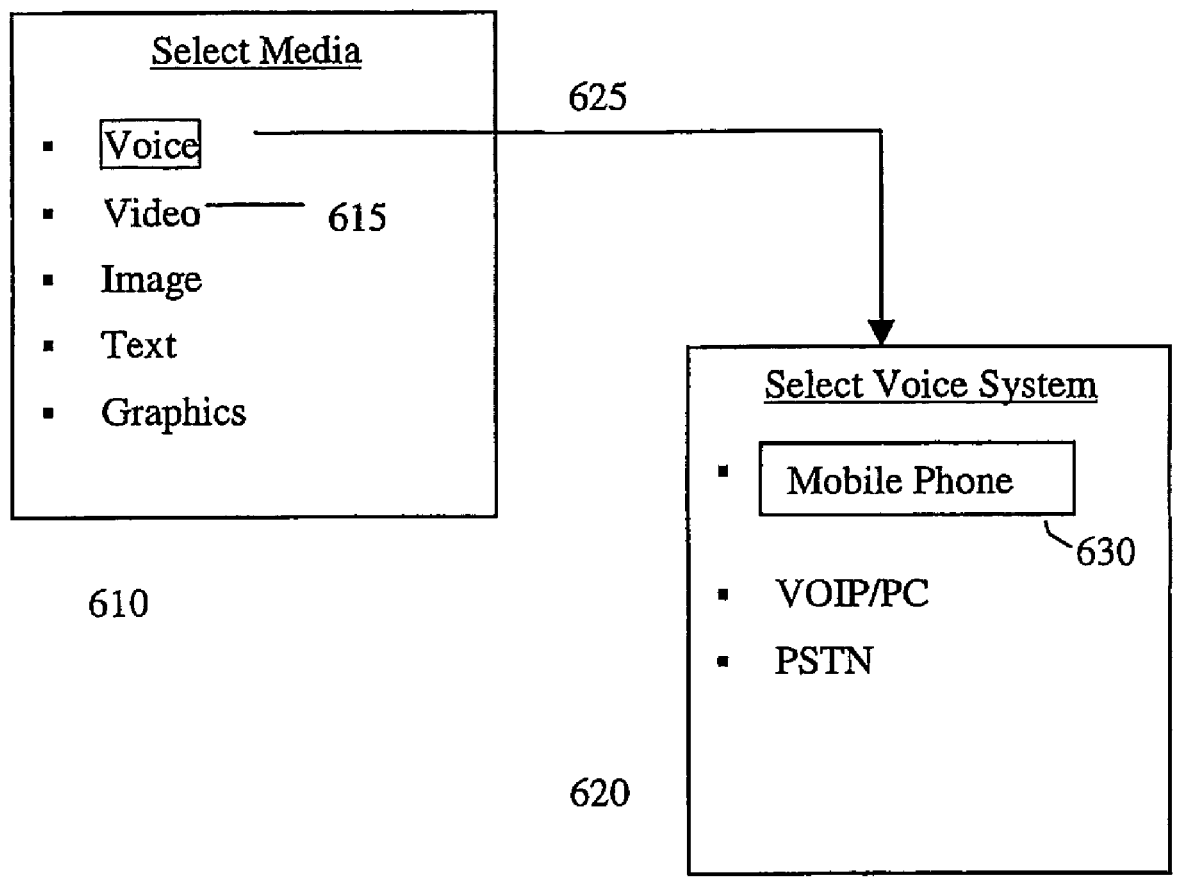
FIG. 6 is an exemplary display for determining of an end user context.

With reference to FIG. 4, FIG. 5, and FIG. 6 the handling of a call will now be described according to a preferred embodiment.

At 810 a caller in environment 110 accesses caller's call handling and alert entity 250 and requests communication with at least a callee, e.g. a callee in environment 120. The request for communication is initiated from any end user system available to the caller e.g. a personal computer connecting to Internet using the HTTP protocol or a mobile phone using a GSM access. As illustrated at 510 in FIG. 5, the call handling and alert entity is accessed from a plurality of networks through interface units 520. The call handling and alert entity of caller generates a user session identity to be used throughout the process of establishing and carrying out of a user session. The user session identity is used to address register 530 where various data pertaining to the session is stored. In response to receiving a request for communication the call handling and alert entity of caller initiates at step 815 a dialogue with caller to determine an initial caller end user context. The context is stored in register 530 and includes the media and identities of the associated end user systems on which these media are to be presented. Exemplary a caller wishes to use a mobile phone for speech communication and a PC for communication of JPEG images. The dialogue includes a step of presenting a list of available end user systems e.g. as registered at registering entity 140. The list might be displayed at a mobile phone having a WAP interface to Internet, at a PC having a HTTP interface or even at a telephone as a voiced dialogue. FIG. 6 shows an exemplary dialogue comprising a first media selection menu at 610 and a second system selection menu at 620 for selection of an end user system that supports a selected medium. Exemplary, at 625, a user has selected the voice medium and at 630 a mobile phone is selected as the corresponding end user system. The caller user dialogue is, at least partly, dependent on the available resources at callee as registered at callee registering entity 140. Exemplary, at selection 615 there is an indication that at least one callee can not process video. The call handling and alert entity of caller addresses the corresponding call handling and alert entity of callee over an interface 520 and can request a link to callee registering entity 140. At step 820 caller call handling and alert entity requests invitation of callee. The request includes the session identity and a reference to the caller initial user context stored in register 530. The call handling and alert entity of callee creates a record in corresponding register 530 and, at step 825, checks register 540 for the end user systems that have been assigned to the callee for processing of invite messages. The invite messages comprise an attention signal and a reference to the associated invite information. At step 830, the call handling and alert entity of callee sends attention messages to specified end user systems in the callee environment 120. The invite information comprises, for example, a short message compiled by the caller and the caller end user context determined by the caller for the current call. The invite information is exemplary stored at register 530 at the call handling and alert entity 250 of the caller. The attention message is sent by any method for connectionless signaling, e.g. as a SMS message or e-mail. The callee attends to the invitation from any of the invited end user systems. The associated linked invite information is, exemplary, stored in a format, e.g. a file descriptive format such as XML, which can be interpreted and presented by any selected end user system. The callee accepts the invitation to communicate with the caller at step 835 whereupon the callee call handling and alert entity initiates a dialogue with callee to determine a callee user context including, e.g., media and identities of corresponding preferred callee end user systems. The dialogue depends on availability of callee end user systems that match the caller context. Callee call handling and alert entity obtains information from callee register entity 140 about callee available end user system capabilities. It is recalled that the system capability includes capabilities of associated supportive services. Thus, a selection from a list of end user systems might involve an approval to connect a supportive service, e.g. a transcoding service, and acceptance of the possible additional costs for using that service. In case callee fails to match caller end user context, call handling and alert entity of callee invokes a dialogue with caller who can then modify caller context. For example, the caller may already have access to other end user systems appropriate for a desired medium or the caller might accept a lower quality medium than the preferred. The negotiation of caller and callee user contexts may proceed until a shared context can be determined.

At step 840 caller and callee approve communication according to the shared end user context having thus been negotiated.

At step 845 the shared context is sent to the session management entity 230 including the session identity. The session management entity compiles information related to all individual terminal-terminal, terminal-host, and host-host sessions required for the user session. The session management entity 230 obtains from register entity 240 information about the end user systems included in the shared end user context and which is required for a complete determination of all sub-sessions involved in the user session. At step 850 the session management entity 230 orders connection management entity 260 to set up all individual connections using the Session Initiation Protocol, SIP.

A current sub-session of a session can be replaced by a new sub-session in response to a changed user environment. A user, having previously received media on a small display, who moves to another position where a larger display is available, is offered a possibility to select the larger display in place of the smaller. The current sub-session associated with the small display is then replaced with a new sub-session associated with the larger display according to the procedure described above. The session management entity 230 can record a change of environment. A dialogue can be initiated with the end user to determine if a change of any current end user system should be executed. If so, the session management entity manages the change.

Description of Alternative Embodiments

In an alternative embodiment each end user system in the environment of an end user has means to connect to a local short-range wireless ad hoc network such as e.g. a Bluetooth™ ad hoc network. A specification of the Bluetooth™ interface is found on the Official Bluetooth™ Web site on the World Wide Web at http://www.bluetooth.com.

Information about end user systems that are available to a particular user is compiled by a predefined end user master system in the local ad hoc network. In response to detection of a change in the local environment of an end user, said master end user system connects to register entity 140, and updates the end user context record associated with the end user.

Criteria for access to surrounding end user systems might be included in determining the environment. Only those end user systems to which an end user has access are included in the environment. Access is controlled exemplary through rights management or through paid access.

The register entity might alternatively be located at said predefined end user master system. Provided the end user master system is assigned an address, e.g. an Internet address, other entities can poll register data by connecting to the end user master system.

Figure 7:
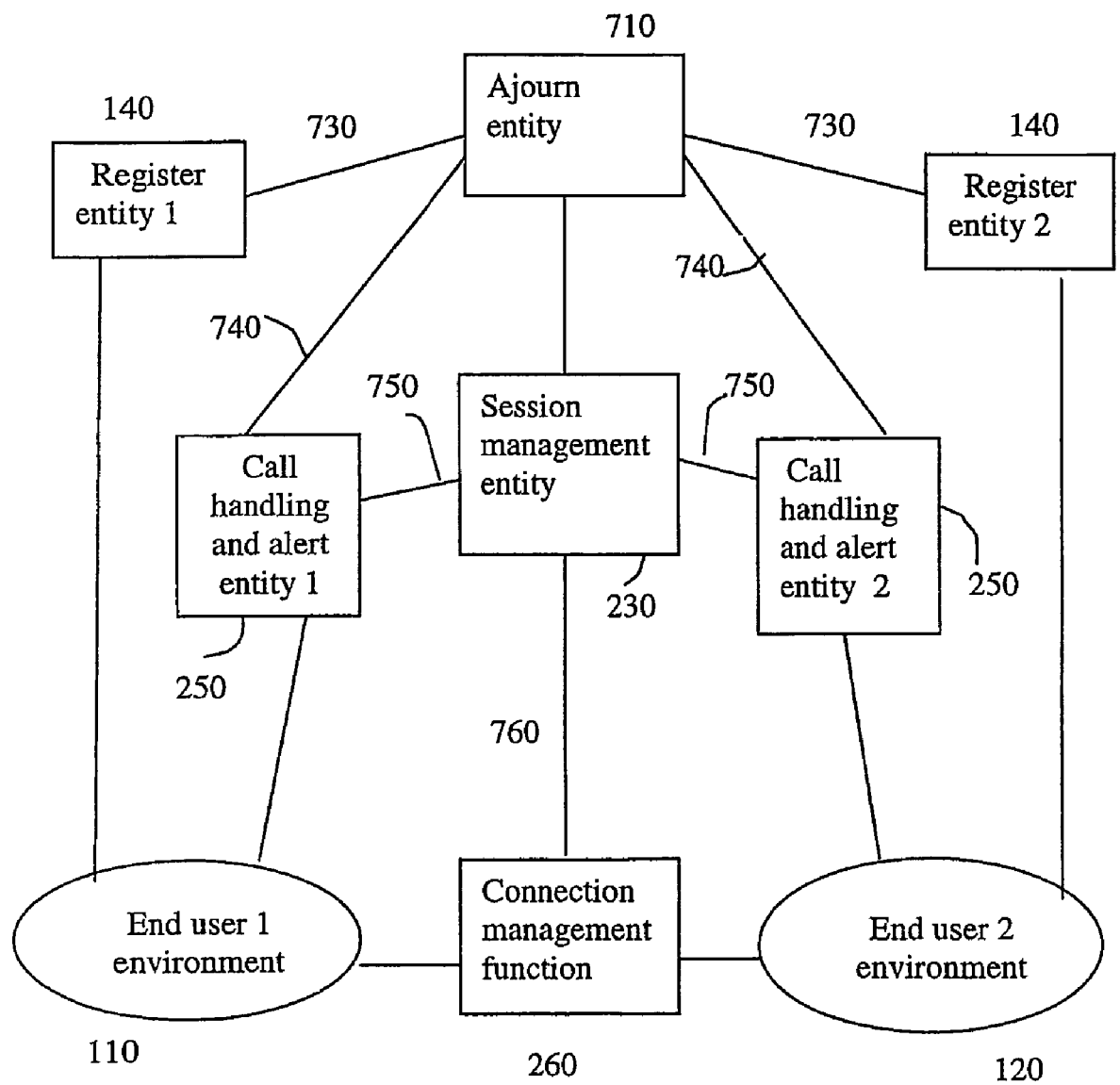
FIG. 7 is a modified functional diagram according to an alternative embodiment.

In one embodiment of the invention, the parties agree to postpone communication e.g. if a matching of current contexts cannot be achieved at the time for first negotiation or if the parties decide to adjourn an ongoing session. The parties might in this case agree to order an adjourn entity to initiate resumed negotiation when predefined conditions are fulfilled. For example, a change of user environment may result in a new set of end user systems, some of which better fulfill conditions for communication. When context matching is found the adjourn-entity initiates invitation of all participating parties and includes invitation information e.g. a shared context. FIG. 7 shows a diagram of entities involved in an exemplary arrangement for implementing an adjourn procedure. Adjourn entity 710 receives from call handling and alert entities 250 data pertaining to an adjourned session, e.g. contexts that should match, time and other conditions for the adjourned session as determined in dialogues with all involved end users. At 730 adjourn entity 710 receives from register entities 140 data pertaining to environmental changes that respective end user has registered. At 740 adjourn entity 710 signals to call handling and alert entities 250 of the end users that conditions for communication, as per data established at time for adjourn, are fulfilled. Invitations are directed to the respective end users and additional dialogues may be carried out. Session management entity 230 receives at 750 a shared context and creates a user session. At 760 establishment of specified connections is requested.

According to one embodiment of the invention, the adjourn entity is implemented at an end user system, e.g. at a mobile phone. Exemplary, a mobile phone at end user 2 in environment 120, previously unable to match for communication with end user 1, downloads end user contexts that should match and other data pertaining to an adjourned session. The mobile phone may, thereafter, supervise environmental changes, e.g. through Bluetooth™ connections to devices in the environment. In response to conditions for communication being fulfilled, the mobile phone connects to the call handling and alert entity and the normal procedure executes for establishing a session.

According to an embodiment of the present invention if the callee does not respond to an invitation, e.g. within a certain time, or if there are no available end user systems for presenting the invitation, then the call handling and alert entity invokes automatic actions. This, exemplary, might involve connection of an answering machine to the caller.

One embodiment of the present invention implements a method for saving Internet addresses, e.g. according to the unpublished U.S. patent application Ser. No. 09/232,165 "Address Allocation". According to this method an end user system is connected to Internet in an idle state. In this state, the end user system does not have an allocated network address but, in the event that communication is requested with the system, a network address is allocated thereto. More specifically, the registering entity 140 might include end-user system identity, e.g. name and domain that translates to a network address by a DNS server. As recalled, the session management entity 230 requests at 261 the connection management entity 260 to establish connections according to a shared user context and includes information on end user system identities. According to this embodiment an end user system that is in idle state, i.e. does not have a network address, is first ordered to request a network address at a DHCP server (Dynamic Host Configuration Protocol, RFC2131). According to the cited document a DNS (Domain Name System, RFC1034, RFC1035) server directs such a request to the idle end user system. The DNS server returns the allocated network address to the connection management entity 260, which, thereafter, establishes the appropriate connections.

What is claimed is:

1. A method for establishing a user multimedia session between a first and a second end user, each end user having access to a respective plurality of end user systems, each end user system comprising at least a user terminal being connected to a respective communications network, comprising the steps of:

storing data for each end user system of each respective plurality of end user systems at a respective storage unit, said data at least relating to the capabilities of each end user system, first user initiating at the first one of said plurality of end user systems transmission of a communication invitation to at least one of a second user's plurality of end user systems, the invitation further determining initial requirements on media capabilities for communication, in dependence of said initial requirements and said storage data, negotiating with the respective party for selection end user system user terminals having appropriate media capabilities, and determining network addresses for selected end user terminals for establishment of sub-sessions of a respective user session between each user terminal and a network node connected to each respective communications network, said sub-sessions being established in response to said data, each sub-session comprising a particular type of media;

interconnecting at the network node said sub-sessions for creation of a multimedia user session.

2. The method of claim 1 wherein that at least one storage unit is located at its associated plurality of end user systems.

3. The method of claim 1 wherein that said step of storing data comprises registering said data at the respective plurality of end user systems and transferring the data for storage at said storage unit.

4. The method of claim 3 wherein that said registering is partly made through end user manual operations at an end user system.

5. The method of claim 3 wherein that the step of registering comprises at least one of said plurality of end user systems connecting over a short range wireless communication system to at least another end user system and polls said data related to the another end user system.

6. The method of claim 3 wherein that said transfer comprises communicating said data over a wireless network.

7. The method of claim 1 wherein that:

the step of negotiation involves determining a supportive service implemented at a service node, said step of establishing comprises creation of further sub-sessions between the service node and said network node, and said interconnecting includes interconnection of said further sub-sessions and said sub-sessions such that the multimedia user session is in support of said service.

8. The method of claim 1 wherein that said step of establishing communication is postponed due to at least one condition for communication not being satisfied.

9. The method of claim 8 in which said condition relates to failure at a time to identify and select a corresponding media enabled end user system, wherein that the availability of such a corresponding system is determined at a later time.

10. The method of claim 9 wherein that said availability is automatically determined at an end user system.

11. An end user system for controlling the creation of a multimedia session, the system having processing and storage means, input means, means for presentation of information, and means for connecting to a communications network, comprising:

means for registering data pertaining to a plurality of identified end user systems determined to belong to an environment of the end user system, means for interaction with a network node for negotiating a selection of media, means for selection of identified end user systems corresponding to the selection of media, and means for transmitting a request to establish a sub-session of a respective user session between each of the selected end user systems and a network node, said request including said selection of identified end user systems, said sub-session being established in response to said data, each sub-session comprising a particular type of media, means at the network node for interconnection of said sub-sessions to form a multimedia user session.

12. The end user system of claim 11 further comprising means for automatic detection of end user systems within a physical environment and means for polling the detected systems for said data.

13. The end user system of claim 12 wherein that said means for detection and polling comprises a short-range wireless communication system connecting to each of said end user systems.

14. A network node connected to at least a communications network for management of a multimedia user session, comprising:

means for receiving a request for communication with identified end users, means for transmitting invitation messages to said identified end users, means for retrieving from a storage location data that relates to at least a plurality of end user systems associated with a said identified end user, means for negotiating with said identified end users in dependence of said stored data selection of media and corresponding media enabled end user systems, means for determining network addresses for selected end user systems and for establishment of sub-sessions of a respective user session between each of the end user systems and a network node, said sub-session being established in response to said data, each sub-session comprising a particular type of media; and means for interconnection of said sub-sessions to form a multimedia user session.

* * * * *